United States Patent [19]

Kung

[11] Patent Number: 5,216,548
[45] Date of Patent: Jun. 1, 1993

[54] COMPOUND LENS SYSTEM

[75] Inventor: Chien-Ping Kung, Taipei, Taiwan

[73] Assignee: Industrial Technology Research Institute, Taichung, Taiwan

[21] Appl. No.: 804,987

[22] Filed: Dec. 10, 1991

[51] Int. Cl.$^5$ .......................... G02B 9/34; G02B 9/36
[52] U.S. Cl. .................................. 359/775; 359/771; 359/778
[58] Field of Search ............................. 359/642–644, 359/656, 659, 662–663, 686–688, 754, 733, 734, 771–783, 796, 797

[56] References Cited

U.S. PATENT DOCUMENTS

| 3,807,836 | 4/1974 | Baker | 359/775 |
| 4,285,579 | 8/1981 | Yamada | 359/775 |
| 4,753,522 | 6/1988 | Nishina et al. | 359/775 |

FOREIGN PATENT DOCUMENTS

| 552080 | 4/1923 | France | 359/775 |
| 318536 | 5/1929 | United Kingdom | 359/775 |

Primary Examiner—Bruce Y. Arnold
Assistant Examiner—Thong Nguyen
Attorney, Agent, or Firm—Cushman, Darby & Cushman

[57] ABSTRACT

A compound lens system specifically designed for use in a handy scanner of a computer system for photographing a printed object. The compound lens is capable of photographing the printed object up to a width of 128 mm, (5.04 in). The compound lens system encompasses four lenses which include a positive lens with a convex surface and a non-concave surface, two biconcave lenses, and a biconvex lens.

7 Claims, 7 Drawing Sheets

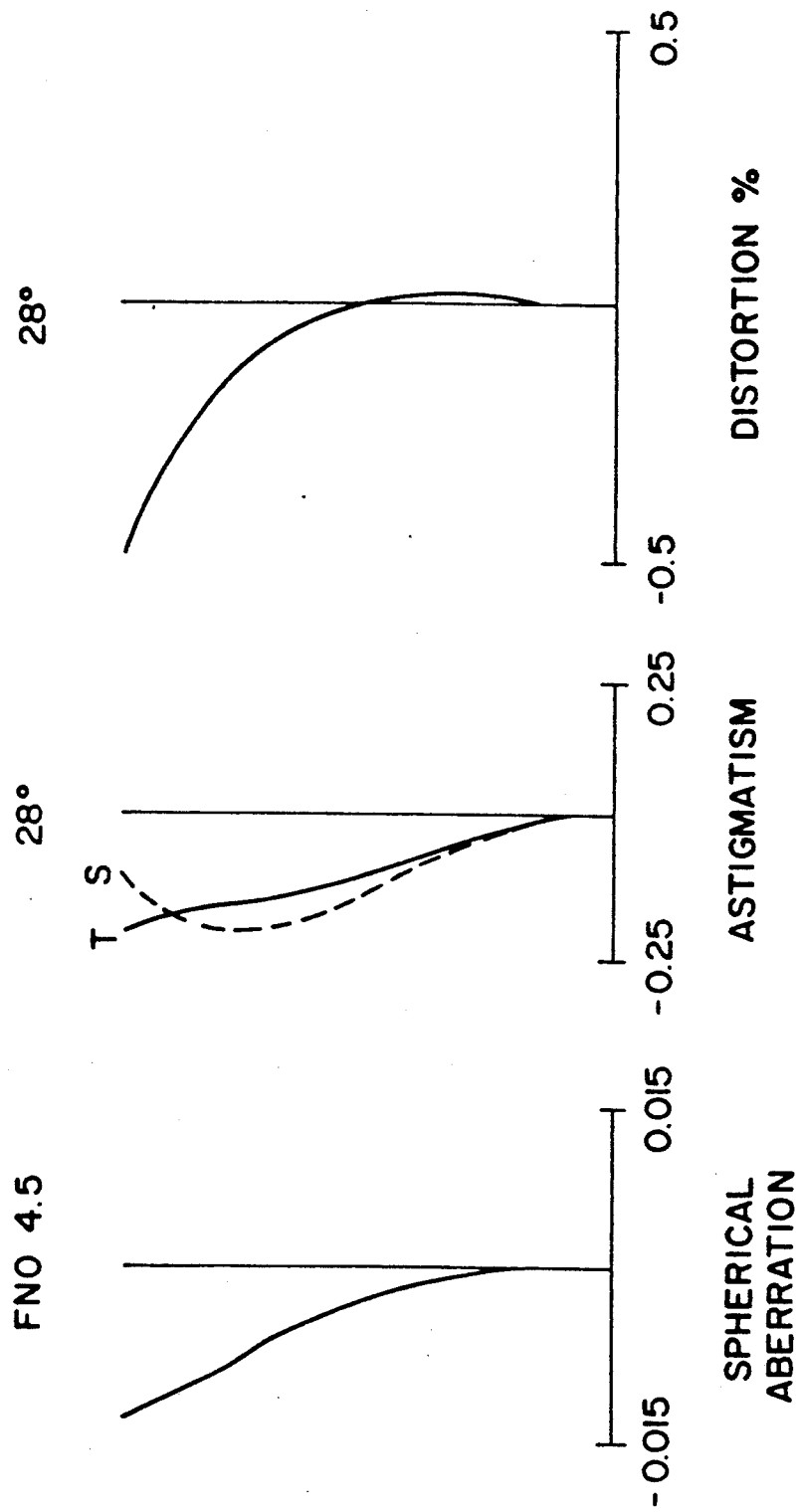

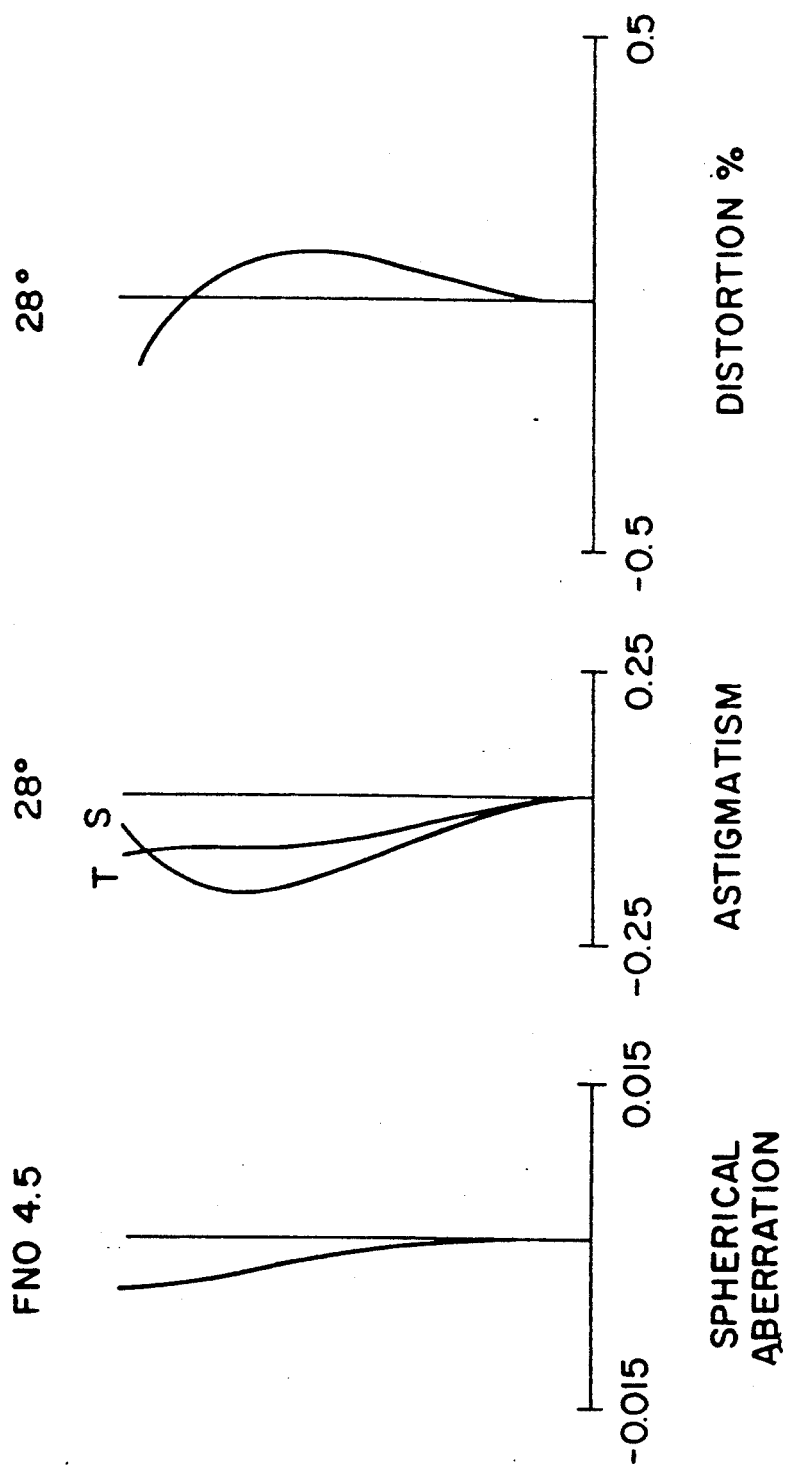

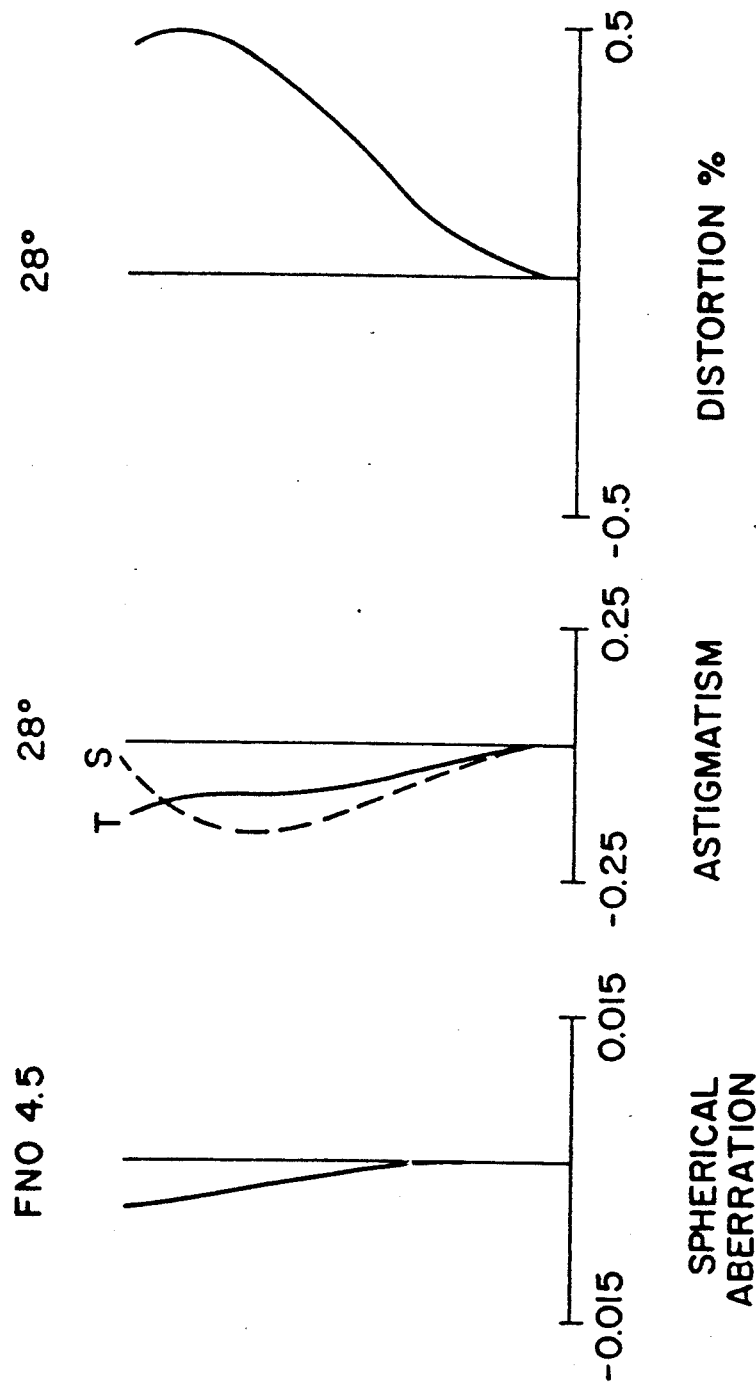

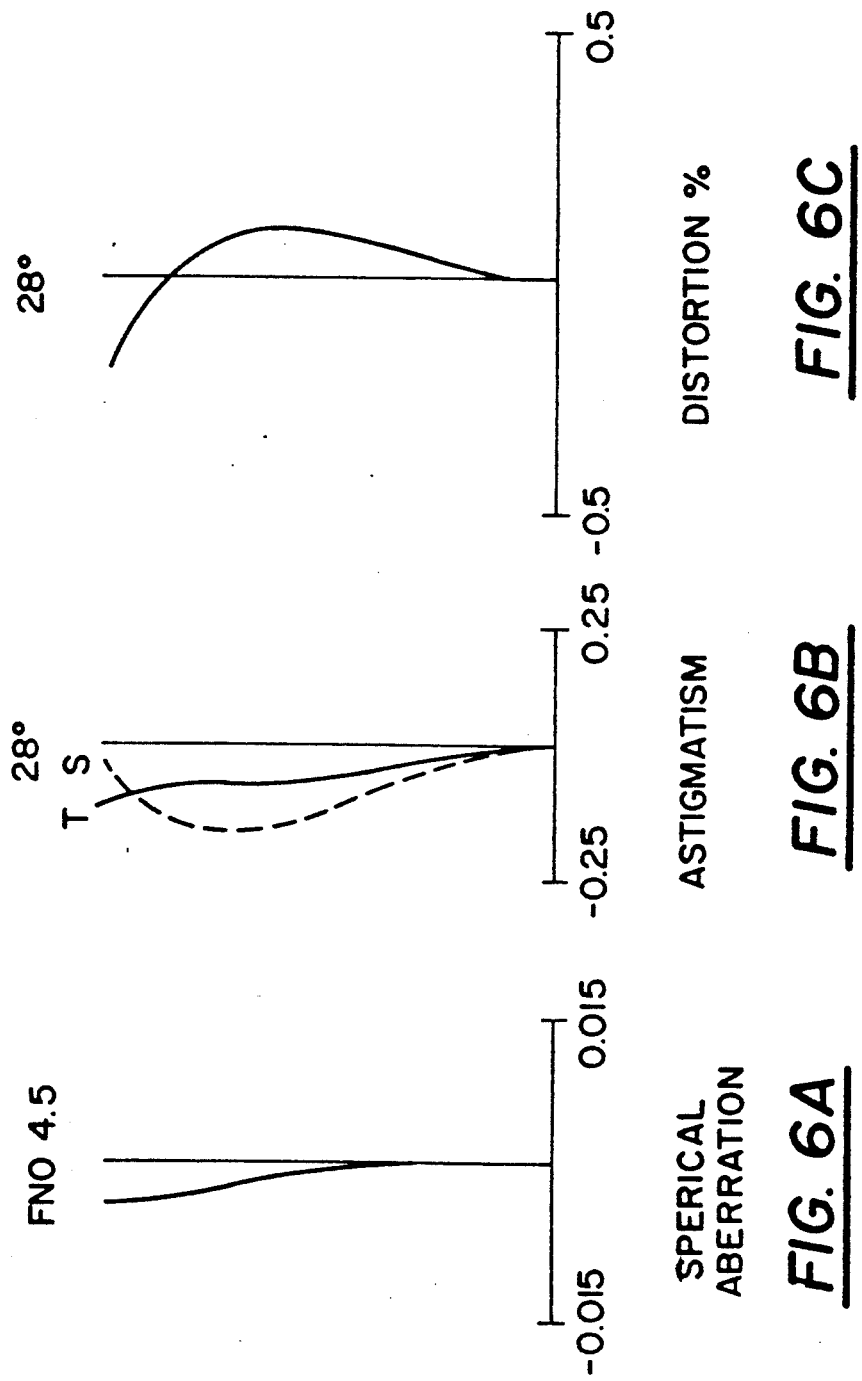

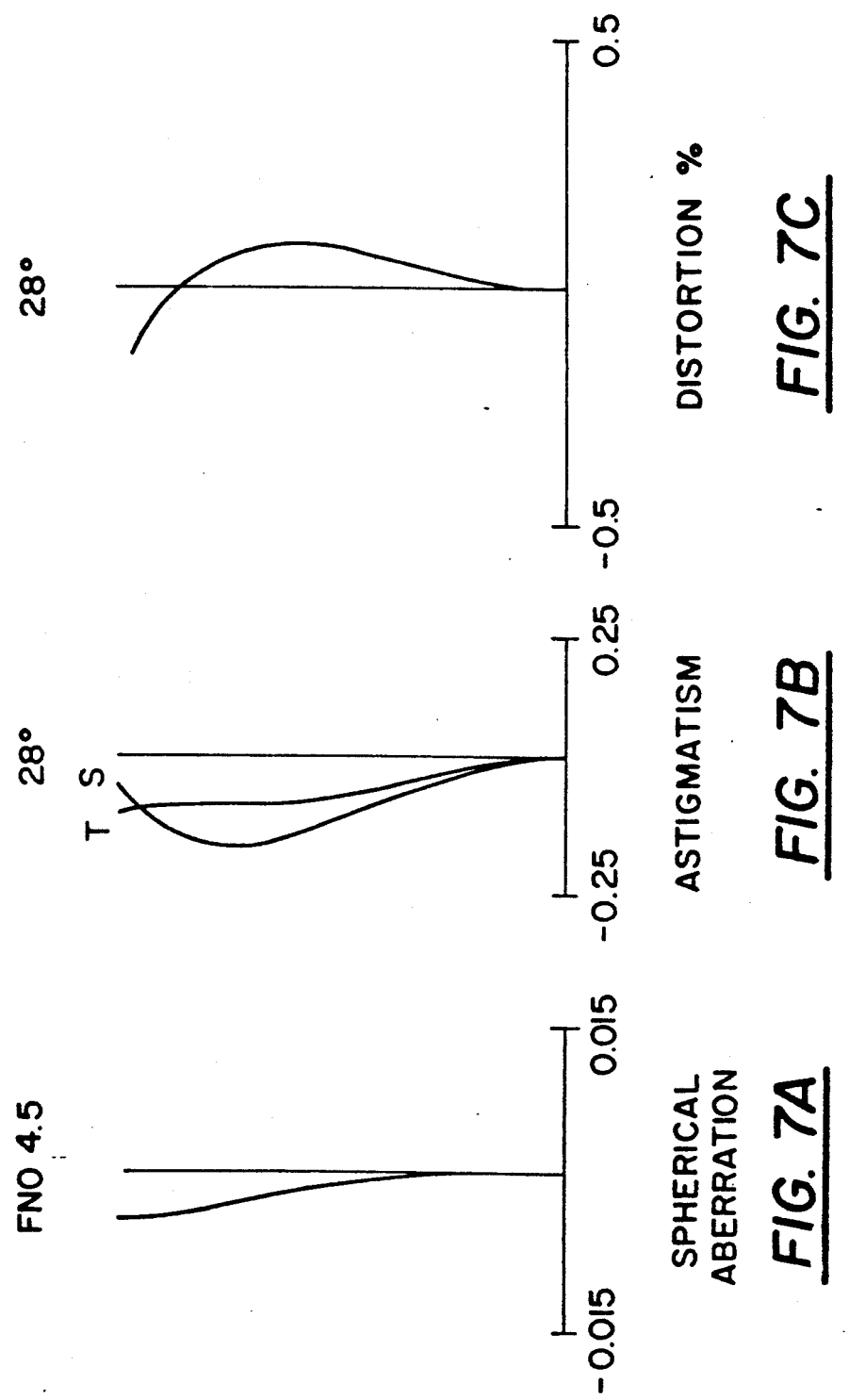

COMPOUND LENS SYSTEM

BACKGROUND OF THE INVENTION

1. Field of the Invention

The present invention relates to a compound lens system. In particular, the compound lens system encompasses four lenses and is specifically used in a handy scanner of a computer system for photographing a printed object.

2. Description of Prior Art

A handy scanner is a device coupled via an interface to a computer system for photographing a printed object into a digital image. As shown in FIG. 1, the handy scanner consists essentially of a lens system 1 for photographing a printed object 3, and a charge coupled device (CCD) 2 for converting the photographed image into a digital image. The digital image can be displayed on a graphic monitor (not shown) connected to the computer and be further processed.

Currently available handy scanners are capable of providing a resolution power for the digital image in the range from 200 DPI to 400 DPI (DPI stands for dot per inch). The lens systems incorporated in these handy scanners are only capable of photographing a width of 105 mm (4.13 in) of the printed object into acceptable sharpness (this width will be hereinafter referred to as the "scanning width"). For objects located outside this width of 105 mm, the photographed image thereof is blurred enough not to be able to be converted into a digital image with acceptable resolution. The blurred edge of the photographed image is due to the aberrations of the lens system.

A usual design purpose of a scanner lens is therefore to cope with the aberration problems such that the scanner lens is capable of photographing a wider dimension of the printed object into sharp image, i.e. offers a wider scanning width.

The scanning width generally can be increase by increasing the dimensions of the lenses included in the lens system of the scanner. However, for a trend leading to small and compact peripheral devices for a computer system, a handy scanner with a large dimension is mostly unfavorable.

SUMMARY OF THE INVENTION

The present invention provides a compound lens system for use with a handy scanner capable of producing a digital image with a resolution of 400 DPI, which is capable of photographing a width of 128 mm (5.04 in) of a printed object into the digital image.

The compound lens system comprises four lenses arranged in line-up along an optical axis.

The first lens is a positive lens with a convex front surface and a non concave rear surface.

The second lens is a negative lens with double concave surfaces.

The third lens is also a negative lens with double concave surfaces.

And the fourth lens is a positive lens with double convex surfaces.

These four lenses are subjected to the following constraints of:

$$1.50 < (r_4/r_6) < 3.00,$$

$$1.45 < (r_7/f_4) < 1.92,$$

$$1.05 < (f_1/f_4) < 1.65,$$

and $$-2.92 < (f_{123}/f_4) < -2.10,$$

where
- $r_4$ is the radius of the rear concave curvature of the second lens;
- $r_6$ is the radius of the rear concave curvature of the third lens;
- $r_7$ is the radius of the front convex curvature of the fourth lens;
- $f_1$ is the focal length of the first lens;
- $f_4$ is the focal length of the fourth lens; and
- $f_{123}$ is a combined focal length of the first lens, the second lens, and the third lens.

BRIEF DESCRIPTION OF THE DRAWINGS

The optical characteristics and performances of the compound lens system according to the present invention will be described hereinafter in full detail by exemplary preferred embodiments and with references made to the accompanying figures, wherein

FIGS. 3A–3C are three graphical representations, showing the optical performances of a first preferred embodiment according to the present invention;

FIGS. 4A–4C are three graphical representations, showing the optical performances of a second preferred embodiment according to the present invention;

FIGS. 5A–5C are three graphical representations, showing the optical performances of a third preferred embodiment according to the present invention;

FIGS. 6A–6C are three graphical representations, showing the optical performances of a fourth preferred embodiment according to the present invention; and FIGS. 7A–7C are three graphical representations, showing the optical performances of a fifth preferred embodiment according to the present invention.

DETAILED DESCRIPTION OF THE PREFERRED EMBODIMENTS

Figure 1:
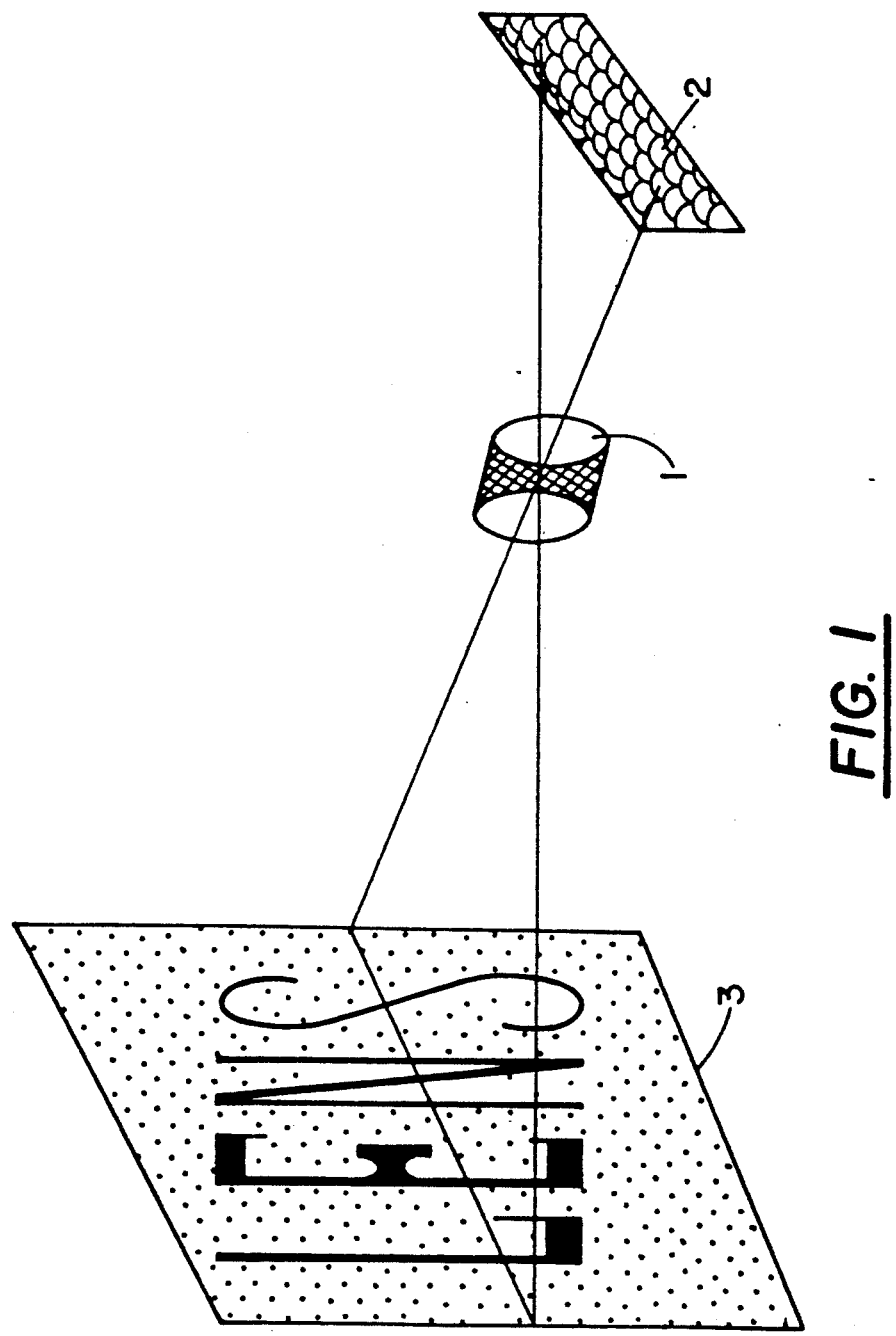
FIG. 1 is a sketched illustration, showing a scanner lens photographing a printed object.
Figure 2:
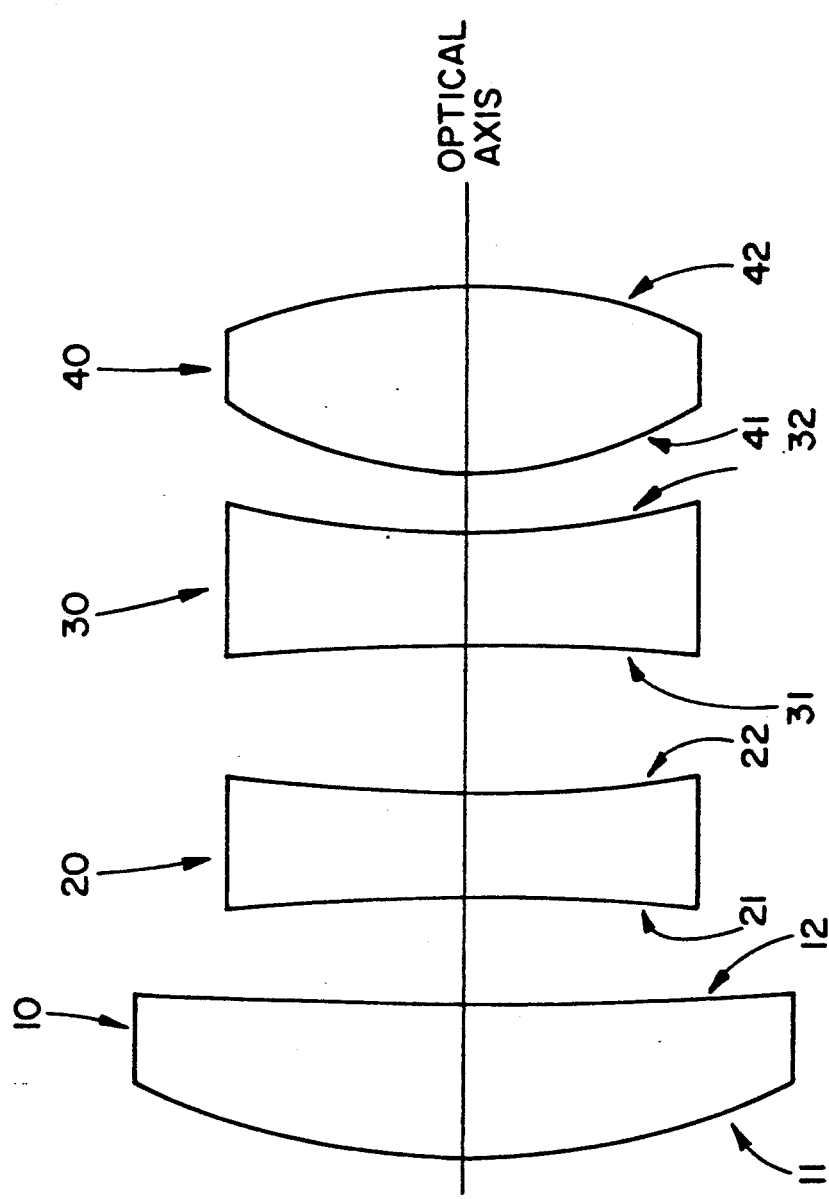
FIG. 2 shows the arrangement of four lenses in the compound lens system according to the present invention.

Referring tm FIG. 2, the compound lens system according to the present invention comprises four lenses arranged in line-up along an optical axis. The spaces between the lenses are filled up with air which has a refractive index of 1.0.

The first lens 10 is a positive lens with a front convex surface 11 and a rear non-concave surface 12 (herein and hereinafter the term "front surface" is referred to as the surface at which a light ray from an object enters into the lens, and the term "rear surface" as the surface at which the light ray leaves from the same lens). The non-concave surface 12 can be either a convex surface or a plane surface. The first lens 10 has a focal length of $f_1$, a thickness of $d_1$ along the optical axis, a refractive index of $n_1$, and an abbe number of $v_1$. The front convex surface 11 has a radius of curvature of $r_1$, and the rear non-concave surface 12 has a radius of curvature of $r_2$.

The second lens is a biconcave lens 20 with the rear concave surface 22 more curved than the front concave surface 21, i.e. the absolute value of the radius of curvature of the rear concave surface is less than that of the front concave surface. The second lens 20 is spaced from the first lens 10 along the optical axis with a distance of $d_{12}$. The second lens 20 has a focal length of $f_2$, a thickness of $d_2$ along the optical axis, a refractive index of $n_2$ and an abbe number of $v_2$. The front concave surface 21 has a radius of curvature of $r_3$, and the rear concave surface 22 has a radius of curvature of $r_4$.

The third lens 30 is also a biconcave lens with the rear surface 32 more curved than the front surface 31. The third lens 30 is spaced from the second lens 20 along the optical axis with a distance of $d_{23}$. The third lens 30 has a focal length of $f_3$, a thickness of $d_3$ along the optical axis, a refractive index of $n_3$, and an abbe number of $v_3$. The front concave surface 31 has a radius of curvature of $r_5$, and the rear concave surface 32 has a radius of curvature of $r_6$.

The fourth lens 40 is a positive lens with a front convex surface 41 and a rear convex surface 42. The fourth lens 40 is spaced from the third lens 30 along the optical axis with a distance of $d_{34}$. The fourth lens 40 has a focal length of $f_4$, a thickness of $d_4$ along the optical axis, a refractive index of $n_4$, and an abbe number of $v_4$. The front convex surface 41 has a radius of curvature of $r_7$, and the rear convex surface 42 has a radius of curvature of $r_8$.

These four lenses 10, 20, 30, 40 are designed with some of their optical parameters subject to the following four constraints of:

$$1.50 < (r_4/r_6) < 3.00,$$

$$1.45 < (r_7/f_4) < 1.92,$$

$$1.05 < (f_1/f_4) < 1.65,$$

and $$-2.92 < (f_{123}/f_4) < -2.10,$$

where $f_{123}$ is a combined focal length of the first lens 10, the second lens 20, and the third lens 30.

The above four constraints are empirical results of a series of experiments conducted to the pursuit of the best image quality. Referring generally to the graphical representations shown in FIGS. 3A-3C, the effects of the numerical values of the four parameters $(r_4/r_6)$; $(r_7/f_4)$, $(f_1/f_4)$, and $(f_{123}/f_4)$ to the image quality have been experimented and found to be:

(1) if $(r_4/r_6) < 1.5$ then a curve representing the degree of astigmatism would veer to the right and the degree of coma is increased such that the sharpness of the photographed image is deteriorated; and if $(r_4/r_6) > 3.0$ then the astigmatism curve would veer to the left and the image sharpness becomes deteriorated.

(2) if $(r_7/f_4) < 1.45$ then the astigmatism curve would veer to the left and the degree of spherical aberration is increased; and if $(r_7/f_4) > 1.92$ the astigmatism curve would veer to the right.

(3) if $(f_1/f_4) < 1.05$ then the astigmatism curve would veer to the left and the degree of spherical aberration is increased; and if $(f_1/f_4) > 1.65$ then the astigmatism curve would veer to the right and the degree of spherical aberration is increased.

(4) if $(f_{123}/f_4) < -2.92$ then the astigmatism curve would veer to the left; and if $(f_{123}/f_4) > -2.1$ then the astigmatism curve would veer to the right and the degree of coma would be increased.

As experimented, a compound lens system satisfying the above restraints will provide a distortion within a range from $-0.5\%$ to $0.5\%$.

Five preferred embodiments according to the present invention and their respective optical performances will be discussed below.

FIRST PREFERRED EMBODIMENT

The design specifications of a first preferred embodiment of the compound lens system according to the present invention is listed in Table 1 below.

TABLE 1

| Radius of Curvature | Lens Thickness | Lens Spacing | Refraction Index | Abbe Number |
|---|---|---|---|---|
| $r_1 = 9.2$ | $d_1 = 3.07$ | $d_{12} = 0.1$ | $n_0 = 1.0$ | $v_1 = 49.3$ |
| $r_2 = \infty$ | $d_2 = 0.8$ | $d_{23} = 0.4$ | $n_1 = 1.743$ | $v_2 = 28.5$ |
| $r_3 = 68.87$ | $d_3 = 1.395$ | $d_{34} = 0.583$ | $n_2 = 1.728$ | $v_3 = 40.7$ |
| $r_4 = 15.24$ | $d_4 = 2.26$ | | $n_3 = 1.581$ | $v_4 = 42.7$ |
| $r_5 = -20.96$ | | | $n_4 = 1.835$ | |
| $r_6 = 9.5$ | | | | |
| $r_7 = 17.37$ | | | | |
| $r_8 = -17.37$ | | | | |

*all length unit in millimeter (mm)

From the above data of optical parameters, we have $$(r_4/r_6) = 1.604,$$

$$(r_7/f_4) = 1.62,$$

$$(f_1/f_4) = 1.16,$$

and $$(f_{123}/f_4) = -2.44;$$

which are all within the scopes of the constraints. The spherical aberration, the astigmatism and the distortion of the compound lens system manufactured in accordance with the optical parameters given in the above table are respectively shown in FIG. 3A to FIG. 3C.

SECOND PREFERRED EMBODIMENT

The design specifications of a second preferred embodiment of the compound lens system according to the present invention is listed in Table 2 below.

TABLE 2

| Radius of Curvature | Lens Thickness | Lens Spacing | Refraction Index | Abbe Number |
|---|---|---|---|---|
| $r_1 = 9.06$ | $d_1 = 2.59$ | $d_{12} = 0.13$ | $n_0 = 1.0$ | $v_1 = 49.3$ |
| $r_2 = 78.405$ | $d_2 = 1.32$ | $d_{23} = 0.4$ | $n_1 = 1.743$ | $v_2 = 28.5$ |
| $r_3 = -96.433$ | $d_3 = 1.392$ | $d_{34} = 0.57$ | $n_2 = 1.728$ | $v_3 = 40.7$ |
| $r_4 = 16.23$ | $d_4 = 1.2$ | | $n_3 = 1.581$ | $v_4 = 42.7$ |
| $r_5 = -19.21$ | | | $n_4 = 1.835$ | |
| $r_6 = 9.5$ | | | | |
| $r_7 = 17.17$ | | | | |
| $r_8 = -16.03$ | | | | |

*all length unit in millimeter (mm)

From the above data of optical parameters, we have $$(r_4/r_6) = 1.71,$$

$$(r_7/f_4) = 1.71,$$

$$(f_1/f_4) = 1.34,$$

and $$(f_{123}/f_4) = -2.30;$$

which are all within the scopes of the constraints. The spherical aberration, the astigmatism and the distortion of the compound lens system manufactured in accordance with the optical parameters given in the above table are respectively shown in FIG. 4A to FIG. 4C.

THIRD PREFERRED EMBODIMENT

The design specifications of a third preferred embodiment of the compound lens system according to the present invention is listed in Table 3 below.

TABLE 3

| Radius of Curvature | Lens Thickness | Lens Spacing | Refraction Index | Abbe Number |
|---|---|---|---|---|
| $r_1 = 9.18$ | $d_1 = 2.97$ | $d_{12} = 0.154$ | $n_0 = 1.0$ | $v_1 = 49.3$ |
| $r_2 = 50.78$ | $d_2 = 1.723$ | $d_{23} = 0.295$ | $n_1 = 1.743$ | $v_2 = 28.5$ |
| $r_3 = -116.68$ | $d_3 = 0.8$ | $d_{34} = 0.7$ | $n_2 = 1.728$ | $v_3 = 40.7$ |
| $r_4 = 20.26$ | $d_4 = 1.464$ | | $n_3 = 1.581$ | $v_4 = 42.7$ |
| $r_5 = -21.61$ | | | $n_4 = 1.835$ | |
| $r_6 = 9.26$ | | | | |
| $r_7 = 19.00$ | | | | |
| $r_8 = -16.60$ | | | | |

*all length unit in millimeter (mm)

From the above data of optical parameters, we have $(r_4/r_6) = 2.18,$ $(r_7/f_4) = 1.762,$ $(f_1/f_4) = 1.354,$ and $(f_{123}/f_4) = -2.66;$ which are all within the scopes of the constraints. The spherical aberration, the astigmatism and the distortion of the compound lens system manufactured in accordance with the optical parameters given in the above table are respectively shown in FIG. 5A to FIG. 5C.

FOURTH PREFERRED EMBODIMENT

The design specifications of a fourth preferred embodiment of the compound lens system according to the present invention is listed in Table 4 below.

TABLE 4

| Radius of Curvature | Lens Thickness | Lens Spacing | Refraction Index | Abbe Number |
|---|---|---|---|---|
| $r_1 = 9.28$ | $d_1 = 2.96$ | $d_{12} = 0.2$ | $n_0 = 1$ | $v_1 = 49.3$ |
| $r_2 = 31.22$ | $d_2 = 1.58$ | $d_{23} = 0.29$ | $n_1 = 1.743$ | $v_2 = 28.5$ |
| $r_3 = -1433.45$ | $d_3 = 0.8$ | $d_{34} = 0.74$ | $n_2 = 1.728$ | $v_3 = 40.7$ |
| $r_4 = 26.23$ | $d_4 = 1.73$ | | $n_3 = 1.581$ | $v_4 = 42.7$ |
| $r_5 = -18.68$ | | | $n_4 = 1.835$ | |
| $r_6 = 9.41$ | | | | |
| $r_7 = 20$ | | | | |
| $r_8 = -15.97$ | | | | |

*all length unit in millimeter (mm)

From the above data of optical parameters, we have $(r_4/r_6) = 2.79,$ $(r_7/f_4) = 1.844,$ $(f_1/f_4) = 1.544,$ and $(f_{123}/f_4) = -2.57;$ which are all within the scopes of the constraints. The spherical aberration, the astigmatism and the distortion of the compound lens system manufactured in accordance with the optical parameters given in the above table are respectively shown in FIG. 6A to FIG. 6C.

FIFTH PREFERRED EMBODIMENT

The design specifications of a fifth preferred embodiment of the compound lens system according to the present invention is listed in Table 5 below.

TABLE 5

| Radius of Curvature | Lens Thickness | Lens Spacing | Refraction Index | Abbe Number |
|---|---|---|---|---|
| $r_1 = 9.26$ | $d_1 = 2.87$ | $d_{12} = 0.2$ | $n_0 = 1$ | $v_1 = 49.3$ |
| $r_2 = 47.32$ | $d_2 = 1.58$ | $d_{23} = 0.29$ | $n_1 = 1.743$ | $v_2 = 28.5$ |
| $r_3 = -109.37$ | $d_3 = 0.8$ | $d_{34} = 0.74$ | $n_2 = 1.728$ | $v_3 = 40.7$ |
| $r_4 = 18.97$ | $d_4 = 1.73$ | | $n_3 = 1.581$ | $v_4 = 42.7$ |
| $r_5 = -22.02$ | | | $n_4 = 1.835$ | |
| $r_6 = 9.19$ | | | | |
| $r_7 = 16$ | | | | |
| $r_8 = -17.373$ | | | | |

*all length unit in millimeter (mm)

From the above data of optical parameters, we have $(r_4/r_6) = 2.06,$ $(r_7/f_4) = 1.58,$ $(f_1/f_4) = 1.475,$ and $(f_{123}/f_4) = -2.41$ which are all within the scopes of the constraints. The spherical aberration, the astigmatism and the distortion of the compound lens system manufactured in accordance with the optical parameters given in the above table are respectively shown in FIG. 7A to FIG. 7C.

From the optical performances of the foregoing preferred embodiments, the compound lens system according to the present invention does provide good image quality at the edges of the photographed image. Therefore, the photographed image is sharp enough to be converted into a digital image with resolution of 400 DPI.

The compound lens system in accordance with the present invention is capable of photographing a width of 128 mm (5.04 in) of a printed object, which is wider than that of conventional scanner lenses. This width of 128 mm corresponds to a viewing angle of 28° for the compound lens system according to the present invention. Compared with the scanning width of 105 mm, which corresponds to a viewing angle of 25°, the compound lens system according to the present invention offers a scanning width which is 18% larger. The photographed image quality of the compound lens according to the present invention is good enough to be used in a scanner system capable of producing a digital image with a resolution of 400 DPI.

Despite the wider scanning width, the compound lens system according to the present invention, nonetheless, is small in size to be incorporated into a compact handy scanner which can easily be hand held by a user.

A further advantage of the compound lens system according to the present invention is that the tolerances of the four lenses 10, 20, 30, 40 are large so that the manufacture of the compound lens system according to the present invention requires less precision. This facilitates the manufacture of the compound lens system and therefore the cost is low.

While the present invention has been described by way of exemplary preferred embodiments, it is understood that various modifications to the above preferred embodiments are possible to those who are skilled in the art of lens design. Therefore, the above mentioned lenses are intended to be illustrative rather than restricting the scope of the present invention.

What is claimed is:

1. A compound lens system for photographing an object, said compound lens system comprising:

a first lens having a front convex surface and a rear non-concave surface, said first lens being disposed such that a light ray from the object will enter thereinto at said front convex surface and leave therefrom at said rear concave surface, said first lens having a focal length of $f_1$, a thickness of $d_1$, a refractive index of $n_1$, and an abbe number of $v_1$, said front convex surface having a radius of curvature of $r_1$, said rear non-concave surface having a radius of curvature of $r_2$;

a second lens having a front concave surface and a rear concave surface, said second lens being disposed such that the light ray leaving from said first lens will subsequently enter thereinto at said front concave surface and leaves therefrom at rear concave surface, said second lens being spaced from said first lens along the an optical axis with a distance of $d_{12}$, said second lens having a focal length of $f_2$, a thickness of $d_2$, a refractive index of $n_2$ and an abbe number of $v_2$, said front concave surface having a radius of curvature of $r_3$, and said rear concave surface having a radius of curvature of $r_4$, the absolute value of $r_3$ being larger than that of $r_4$;

a third lens having a front concave surface and a rear concave surface, said third lens being disposed such that the light ray leaving from said second lens will subsequently enter thereinto at said front concave surface and leaves therefrom at rear concave surface, said third lens being spaced from said second lens along the optical axis with a distance of $d_{23}$, said third lens having a focal length of $f_3$, a thickness of $d_3$, a refractive index of $n_3$, and an abbe number of $v_3$, said front concave surface having a radius of curvature of $r_5$, and said rear concave surface having a radius of curvature of $r_6$, the absolute value of $r_5$ being larger than that of $r_6$; and a fourth lens having a convex front surface and a rear convex surface, said fourth lens being disposed such that the light ray leaving from said third lens will subsequently enter thereinto at said front convex surface and leaves therefrom at said rear convex surface, said fourth lens being spaced from said third lens along the optical axis with a distance of $d_{34}$, said fourth lens having a focal length of $f_4$, a thickness of $d_4$, a refractive index of $n_4$ and an abbe number of $v_4$, said front convex surface having a radius of curvature of $r_7$, and said rear convex surface having a radius of curvature of $r_8$;

wherein said first lens, said second lens, said third lens, and said fourth lens satisfying the following conditions of:

$1.50 < (r_4/r_6) < 3.00$, $1.45 < (r_7/f_4) < 1.92$, $1.05 < (f_1/f_4) < 1.65$, and $-2.92 < (f_{123}/f_4) < -2.10$, where $f_{123}$ is a combined focal length of said first lens, said second lens, and said third lens.

2. A compound lens system as claimed in claim 1, further comprising a medium having a refractive index $n_0$, which fills up all the empty spaces between said first lens and said fourth lens.

3. The compound lens system as claimed in claim 2, wherein

| | | | |
|---|---|---|---|
| $r_1 = 9.2$, | $r_2 = \infty$, | $r_3 = -68.87$, | $r_4 = 15.24$, |
| $r_5 = -20.96$, | $r_6 = 9.5$, | $r_7 = 17.37$, | $r_8 = -17.37$; |
| $d_1 = 3.07$, | $d_2 = 0.8$, | $d_3 = 1.395$, | $d_4 = 2.26$; |
| $d_{12} = 0.1$, | $d_{23} = 0.4$, | $d_{34} = 0.583$; | |
| $n_0 = 1$; | | | |
| $n_1 = 1.743$, | $n_2 = 1.728$, | $n_3 = 1.581$, | $n_4 = 1.835$; |
| $v_1 = 49.3$, | $v_2 = 28.5$, | $v_3 = 40.7$, | $v_4 = 42.7$; | all length units being in millimeter (mm).

4. The compound lens system as claimed in claim 2, wherein

| | | | |
|---|---|---|---|
| $r_1 = 9.06$, | $r_2 = 78.405$, | $r_3 = -96.433$, | $r_4 = 16.23$, |
| $r_5 = -19.21$, | $r_6 = 9.5$, | $r_7 = 17.17$, | $r_8 = -16.03$; |
| $d_1 = 2.59$, | $d_2 = 1.32$, | $d_3 = 1.392$, | $d_4 = 1.2$; |
| $d_{12} = 0.13$, | $d_{23} = 0.4$, | $d_{34} = 0.57$; | |
| $n_0 = 1$; | | | |
| $n_1 = 1.743$, | $n_2 = 1.728$, | $n_3 = 1.581$, | $n_4 = 1.835$; |
| $v_1 = 49.3$, | $v_2 = 28.5$, | $v_3 = 40.7$, | $v_4 = 42.7$; | all length units being in millimeter (mm).

5. The compound lens system as claimed in claim 2, wherein

| | | | |
|---|---|---|---|
| $r_1 = 9.18$, | $r_2 = 50.78$, | $r_3 = -116.68$, | $r_4 = 20.26$, |
| $r_5 = -21.61$, | $r_6 = 9.26$, | $r_7 = 19$, | $r_8 = -16.6$; |
| $d_1 = 2.97$, | $d_2 = 1.723$, | $d_3 = 0.8$, | $d_4 = 1.464$; |
| $d_{12} = 0.154$, | $d_{23} = 0.295$, | $d_{34} = 0.7$; | |
| $n_0 = 1$; | | | |
| $n_1 = 1.743$, | $n_2 = 1.728$, | $n_3 = 1.581$, | $n_4 = 1.835$; |
| $v_1 = 49.3$, | $v_2 = 28.5$, | $v_3 = 40.7$, | $v_4 = 42.7$; | all length units being in millimeter (mm).

6. The compound lens system as claimed in claim 2, wherein

| | | | |
|---|---|---|---|
| $r_1 = 9.28$, | $r_2 = 31.22$, | $r_3 = -1433.45$, | $r_4 = 26.23$, |
| $r_5 = -18.68$, | $r_6 = 9.41$, | $r_7 = 20$, | $r_8 = -15.97$; |
| $d_1 = 2.96$, | $d_2 = 1.58$, | $d_3 = 0.8$, | $d_4 = .1.73$; |
| $d_{12} = 0.2$, | $d_{23} = 0.29$, | $d_{34} = 0.74$; | |
| $n_0 = 1$; | | | |
| $n_1 = 1.743$, | $n_2 = 1.728$, | $n_3 = 1.581$, | $n_4 = 1.835$; |
| $v_1 = 49.3$, | $v_2 = 28.5$, | $v_3 = 40.7$, | $v_4 = 42.7$; | all length units being in millimeter (mm).

7. The compound lens system as claimed in claim 2, wherein

| | | | |
|---|---|---|---|
| $r_1 = 9.26$, | $r_2 = 47.32$, | $r_3 = -109.37$, | $r_4 = 18.97$, |
| $r_5 = -22.02$, | $r_6 = 9.19$, | $r_7 = 16$, | $r_8 = -17.373$; |
| $d_1 = 2.87$, | $d_2 = 1.58$, | $d_3 = 0.8$, | $d_4 = 1.73$; |
| $d_{12} = 0.2$, | $d_{23} = 0.29$, | $d_{34} = 0.74$; | |
| $n_0 = 1$; | | | |
| $n_1 = 1.743$, | $n_2 = 1.728$, | $n_3 = 1.581$, | $n_4 = 1.835$; |
| $v_1 = 49.3$, | $v_2 = 28.5$, | $v_3 = 40.7$, | $v_4 = 42.7$; | all length units being in millimeter (mm).

* * * * *